2,782,146

FLUIDIZING ACID SLUDGES

Henry C. Paulsen and Joseph W. Dowling, Elizabeth, N. J., assignors to Esso Research and Engineering Company, a corporation of Delaware No Drawing. Application May 9, 1952, Serial No. 287,032

3 Claims. (Cl. 196—148)

This invention relates to improvements in the processing of acid sludges and in particular to the improvement in the handling of heavy sulfuric acid sludges through a pumping system.

The sludges produced during the sulfuric acid treating of petroleum distillates contain, in addition to free acid, the polymerized, oxidized or sulfonated materials removed from the treated distillate together with the asphaltic materials and sulfur compounds.

The chemical and physical characteristics of acid sludges vary considerably depending on the original distillate, concentration of the sulfuric acid, contact time and temperature. For instance, white oil sludges which result from the stringent treatment of specific distillates with oleum or sulfur trioxide, are usually extremely viscous and tend to solidify on storage at atmospheric conditions. Heating and lubricating oil acid sludges which result from the treatment with 75 to 85% sulfuric acid are usually more fluid but also tend to solidify.

Disposal of acid sludges and recovery of spent sulfuric acid is a complicated and troublesome refinery problem.

Sludges resulting from sulfuric acid anhydride treatment of the heavier distillates are thermally decomposed with the recovery of sulfur dioxide and the conversion of the organic constituents to coke. The sulfur dioxide is catalytically converted to sulfur trioxide followed by hydration to sulfuric acid. The coke is used as fuel.

The heating and lubricating oil sludges are hydrolyzed by aqueous dilution which results in the separation of the sulfuric acid from the organic materials which then appear as tars. The diluted acid is restored, commercially, for further use by vacuum distillation.

Prior to restoration, spent acid is settled in order that the suspended and emulsified organic material may separate out. A large tank is usually employed wherein the organic material rises to the surface of the sulfuric acid as a viscous tar. Such a settling operation is necessary in order to reduce the carbon content to a level tolerable to the concentrating equipment. In addition, the tank provides some surge capacity between the refinery and the vacuum concentrators.

One cause of a reduction in the service factor experienced by the concentrator unit in handling refinery spent acid arises from accumulation, in the storage tank, of the tar which hardens into coke-like material. This necessitates the periodical removal of the storage tank from service, thereby causing a shut-down of the acid concentrating unit.

Coking of the tar is the result of prolonged contact with the sulfuric acid and air. Since acid is being continuously withdrawn and charged to the tank, the new additions of viscous tar on rising to the surface agglomerates with the coke from previous charges. The agglomerated tar-coke masses increase with time so that the final result is a non-fluid, ever increasing, layer floating on the acid surface. Eventually the tar-coke mass fills the tank and necessitates the removal of the tank from service.

Removal of the coke from the tank is an expensive and time consuming project since the coke must be broken up and removed by hand.

It is, therefore, the main object of this invention to treat acid sludges so that the same may be pumped long distances.

It is a further object of this invention to prevent the deposition of hard, solid, unpumpable tar from spent acid obtained from acid sludges.

Other objects and advantages of the invention will become apparent from the following description thereof.

Heretofore various methods have been tried to convert lubricating oil acid sludges into more fluid material to be used as boiler fuel. Included among such methods have been the fluxing of the sludge with varying proportions of fuel oil or dilution with the more fluid acid sludge from the treating of naphtha. Additional fluxing agents, for example, caustic, lime, and sulfuric acid, have been added to the sludge. Treatment of the sludge with open steam has also been tried. Such methods have been only partially successful and in some cases it has not been possible to change the nature of the hard, unpumpable acid sludges.

According to the present invention, acid sludge, after removal from the treated oil, is thoroughly mixed with 2–6 vol. percent of a phenol with or without the addition of organic acids such as naphthenic acids.

The phenols used may be the lower phenols such as monohydroxy benzene, cresols, and the like or the higher phenols such as alkylated phenols derived from petroleum. The phenols may be used alone or mixed with naphthenic or other organic acid. A particularly suitable mixture of phenols and organic acid is that obtained by the acidification of spent alkali obtained by treating cracked petroleum distillates with caustic soda. The stocks which are treated with the caustic to prepare the spent lye should not be contacted with sulfuric acid prior to the caustic treatment because the acid treating removes the phenols from the distillate. Likewise spent lye from the treatment of virgin stocks is not suitable since the virgin stocks do not contain phenols which can be economically extracted by the caustic.

The amount of phenols and organic acids used depends upon the consistency of the sludge to be treated, but generally 2 to 6 volume percent is sufficient. The ratio of phenols to organic acids is likewise variable and may range from 1:3 to 1:1. To more readily carry out the mixing of the sludge and the phenols and acids heat may be employed to advantage. A temperature of 150 to 200° F. has been found to be beneficial.

The advantages of the invention will be better understood from a consideration of the following experimental data which are given for the sake of illustration, but without intention of limiting the invention thereto.

EXAMPLE 1

A 5 vol. percent mixture of 23% petroleum phenols, 67% organic acids, and 10% oil obtained by the acidification of spent caustic solutions used in the treatment of cracked petroleum distillates were added to a viscous acid sludge. The viscosity of the sludge was determined and the sludge stored. After two weeks the viscosities were again determined. The results are shown in the following table:

Table I

[Fluidizing effect of a petroleum phenol organic acid mixture on white oil sludges.]

| Blend Composition | Before Storage Vis. (cp. @ 40° C.) | After 2 Wks. Storage @ R. T. Vis. (cp. @ 40° C.) |
|---|---|---|
| No additive | 20,300 | 38,600 |
| 5% Pet. Phenol-organic acid (*) | 5,700 | 16,500 |
| 15% Pet. Phenol-organic acid | 4,850 | 9,300 |
| 5% 95% H₂SO₄ | 12,000 | 26,000 |
| 15% 95% H₂SO₄ | 4,130 | 8,600 |

* Using petroleum phenols only showed 7,200 cp. at 40° C. viscosity.

The above data clearly show that 5 vol. percent addition of the phenols and organic acids to the sludge reduced its viscosity from 20,300 cps. to 5,700 cps. before storage and from 38,600 cps. to 16,500 cps. after two weeks' storage.

Visual observations of the stored sludge and H₂SO₄ and the phenolic blends showed that the phenolic blends were homogeneous while the H₂SO₄ blends were stratified with a thick surface crust. The low viscosity value reported for the 15% H₂SO₄ blend, after storage, is thought to be erroneous since during the determination relatively large coke like masses interfered. Furthermore, SO₂ evolution was quite noticeable in the case of the stored sludge-sulfuric acid blends. Sulfur dioxide evolution from the phenol-organic acid blends was considerably less.

EXAMPLE 2

Commercial spent acid storage conditions were simulated in the laboratory by setting up two glass settling columns of 1.5 liters capacity. The columns were open to the atmosphere at the top. A common inlet and outlet valve was located at the bottom of the columns.

Six volume percent of a mixture of petroleum phenols and organic acids, obtained by acidifying the spent caustic from the refining of cracked petroleum oils and based on a liter of spent acid, was charged to one of the columns. No fluxing agent was added to the second column.

Over a period of three months, eighteen recharges of refinery spent acid were added to the two columns. Special care was taken during the withdrawing and recharging of the column to avoid loss of the fluxing agent. The columns were maintained at room temperature (70-80° F.).

Visual observations of the storage columns over the three month period has shown that the petroleum phenol-organic acid mixture appears to stabilize the separated tar in that no coking was evident and the tar remained fluid and each additional recharge of refinery spent acid to the storage column, containing no fluxing agent, served to increase the hardened coke deposit on the column wall at the liquid surface.

EXAMPLE 3

To show that lower molecular weight phenols are more active in reducing the viscosity than the higher molecular weight phenolic compounds, 5 and 10 volume percent each of monohydroxy benzene and of petroleum phenols were added to a viscous acid sludge and the viscosity compared. The data are shown in the following table:

Table II

| Sludge sample: | Viscosity, centistokes at 40° C. |
|---|---|
| As is | 47,500 |
| Plus 5 vol. percent pet. phenols | 15,500 |
| Plus 10 vol. percent pet. phenols | 9,700 |
| Plus 5 vol. percent phenol | 12,400 |
| Plus 10 vol. percent phenol | 6,700 |

The above data show that the petroleum phenols and especially the lower molecular weight compounds, regardless of source, are very effective sludge fluidizers even without the presence of organic (naphthenic) acids. The use of phenol-organic (naphthenic) acid mixtures as fluidizing agents are also very satisfactory and more practical than using the constituents separately.

The nature of the present invention having been thus fully set forth and specific examples of the same given, what is claimed as new and useful and desired to be secured by Letters Patent is:

1. The method of conditioning heavy viscous substantially unpumpable sulfuric acid sludge to facilitate pumping thereof and prevent the settling out of unpumpable tar from spent acid obtained therefrom, said sulfuric acid sludge being obtained from the sulfuric acid treatment of a petroleum oil, comprising mixing said acid sludge with at least 2 volume percent of a compound selected from the group consisting of phenol and alkylated phenol.

2. Process according to claim 1 in which the material added to the acid sludge is a mixture of naphthenic acids and compounds selected from the group consisting of phenol and alkylated phenol.

3. Process according to claim 2 in which the material added to the acid sludge is a mixture of 23 volume percent of phenols, 67 volume percent of organic acids, and 10 volume percent occluded oil, said mixture being obtained by the acidification of spent caustic from the treating of non-acid-treated cracked petroleum oils.

References Cited in the file of this patent

UNITED STATES PATENTS

| 2,293,253 | Galindo et al. | Aug. 18, 1942 |
| 2,418,784 | McCormick et al. | Apr. 18, 1947 |

OTHER REFERENCES

Gurwitsch et al.: Scientific Principles of Petroleum Technology, New Edition, published by Chapman and Hall Ltd. 11, Henrietta Street, London (1932), page 428.

Kalichevsky et al.: Chemical Refining of Petroleum, pp. 115 and 123. Published by the Chemical Catalog Co., New York, N. Y. (1933).

Richter: The Chemical of the Carbon Compounds, Elsevier Publ. Co., Inc. New York, N. Y. (1946) vol. III, page 212.